(12) United States Patent
Kitahara

(10) Patent No.: US 7,556,385 B2
(45) Date of Patent: Jul. 7, 2009

(54) PROJECTOR

(75) Inventor: Akira Kitahara, Siojirishi (JP)

(73) Assignee: Seiko Epson Corporation, Tokyo (JP)

( * ) Notice: Subject to any disclaimer, the term of this patent is extended or adjusted under 35 U.S.C. 154(b) by 430 days.

(21) Appl. No.: 11/295,439

(22) Filed: Dec. 7, 2005

(65) Prior Publication Data
US 2006/0170885 A1 Aug. 3, 2006

(30) Foreign Application Priority Data
Jan. 31, 2005 (JP) ............... 2005-022682

(51) Int. Cl.
G03B 21/14 (2006.01)
G03B 21/22 (2006.01)
G03B 21/26 (2006.01)
H04N 5/64 (2006.01)

(52) U.S. Cl. ............ 353/119; 353/56; 353/122; 348/794; 348/787

(58) Field of Classification Search ........... 353/119, 353/56, 122; 348/794, 787, 788, 810–820
See application file for complete search history.

(56) References Cited
U.S. PATENT DOCUMENTS 3,805,281 A * 4/1974 Narita et al. ............ 396/59
4,716,465 A * 12/1987 Meyer ............ 348/211.2
5,170,196 A * 12/1992 Itoh ............ 353/122
6,485,144 B1* 11/2002 Liao ............ 352/243
2005/0077454 A1* 4/2005 Ohtomo et al. ............ 250/221

FOREIGN PATENT DOCUMENTS

| JP | U-58-28837 | 2/1983 |
| JP | U 1-65534 | 4/1989 |
| JP | U-7-43247 | 8/1995 |
| JP | A 2001-125191 | 5/2001 |
| JP | A-2002-122485 | 4/2002 |
| JP | A-2004-236007 | 8/2004 |
| JP | 2004287190 A * | 10/2004 |
| JP | A-2004-287190 | 10/2004 |

* cited by examiner

Primary Examiner—Diane I Lee
Assistant Examiner—Magda Cruz
(74) Attorney, Agent, or Firm—Oliff & Berridge, PLC

(57) ABSTRACT

A projector for image projection, includes: an optical element included by an optical system to project an image; a tripod that supports the projector; and a tripod-fixing part that is connected with the optical element and fixes the tripod, wherein the tripod and tripod-fixing part are each constituted by a heat-conductive member.

5 Claims, 4 Drawing Sheets

PROJECTOR

BACKGROUND

1. Technical Field

The present invention relates to a projector that has the function of reducing the heat generated by an optical element such as a light source.

2. Related Art

Not concerning a projector, but in the art has been known a mobile transceiver operated using a tripod, which has a structure increased in the efficiency of heat dissipation by means of disposing its exothermic part in a lower portion of the housing in contact with a tripod-attachment part to fix the tripod. Such mobile transceiver is disclosed in JP-UM-A-1-65534.

However, the application of the structure shown by JP-UM-A-1-65534 to a projector poses a disadvantage as follows. The efficiency of thermal conduction is decreased owing to the tripod-attachment part removable from the exothermic part and an increase in thermal resistance at the connecting portion between the tripod-attachment part and the exothermic part, whereby the efficiency of heat dissipation is decreased. In addition, there is another disadvantage in that the efficiency of heat dissipation is further decreased when the structure is applied in the condition where the tripod-attachment part (with the tripod that the tripod-attachment part is fixing) is removed.

SUMMARY

An advantage of some aspects of the invention is to provide a projector that has a tripod, whereby the efficiency of heat dissipation is increased.

To achieve the advantage, a projector for image projection according to an aspect of the invention includes: an optical element included by an optical system to project an image; a tripod that supports the projector; and a tripod-fixing part that is connected with the optical element and fixes the tripod, wherein the tripod and tripod-fixing part are each constituted by a heat-conductive member.

In the projector, the tripod and tripod-fixing part to fix the tripod are integrated with the main body of the projector. The tripod and tripod-fixing part are arranged so that they are nonremovable from-the projector main body. As a result of such arrangement, the heat generated by the optical element is transmitted to the tripod-fixing part connected with the optical element and constituted by a heat-conductive member. The heat that has reached the tripod-fixing part is conducted to the tripod constituted by a heat-conductive member. Then, the heat transmitted to the tripod is released into the outside air, whereby the optical element is cooled. The configuration according to an aspect of the invention can increase the efficiency of heat conduction and the efficiency of heat dissipation in comparison to the configuration in the art, according to which a tripod-attachment part is removably attached to an exothermic part thereby to cool the exothermic part.

It is preferable that the projector further includes a part that constitutes a circuit to send and receive radio waves, wherein the part constituting the circuit and the tripod-fixing part are provided in positions opposed to each other with the optical element located in a middle of a spacing therebetween.

In the projector, the part constituting the circuit and the tripod-fixing part are provided in positions opposed to each other with the optical element located in the middle of a spacing therebetween, whereby the part that constitutes the circuit can be located at a distance from the tripod-fixing part, to which the tripod is fixed, inside the projector main body. Thus, the heat generated by the optical element is transmitted to the tripod-fixing part, whereby the heat can be kept at a distance from the part that constitutes the circuit. Therefore, the conduction of the heat generated by the optical element to the part that constitutes the circuit can be reduced.

For the projector, it is preferable to further include a part that constitutes a circuit to send and receive radio waves. In addition, it is preferable that the tripod is constituted by a heat-conductive and electrically conductive member. Further, the tripod-fixing part is preferably constituted by a heat-conductive and electrically insulative member. Still further, it is preferable that at least one leg of the tripod is connected to the part that constitutes the circuit through an electrically conductive connecting member.

In the projector, use of the heat-conductive tripod and heat-conductive tripod-fixing part increases the efficiency of heat conduction. In addition, the tripod, which is constituted by an electrically conductive member, is connected by the electrically conductive connecting member to the part constituting the circuit to send and receive radio waves, thereby enabling the use of the tripod as antenna. Further, the tripod-fixing part to fix the tripod is constituted by an electrically insulative member and as such, it becomes possible to prevent noise from entering the part constituting the circuit and therefore the sensitivities of sending and receiving radio waves can be improved.

It is preferable for the projector that the part constituting the circuit and the tripod-fixing part are provided in positions opposed to each other with the optical element located in the middle of a spacing therebetween.

In the projector, the part constituting the circuit and the tripod-fixing part are provided in positions opposed to each other with the optical element located in the middle of a spacing therebetween, whereby the part that constitutes the circuit can be located at a distance from the tripod-fixing part, to which the tripod is fixed, inside the projector main body. Thus, the heat generated by the optical element is transmitted to the tripod-fixing part, whereby the heat can be kept at a distance from the part that constitutes the circuit. Therefore, the conduction of the heat generated by the optical element to the part that constitutes the circuit can be reduced. In the case of using the tripod as an antenna, it is possible to prevent noise from entering the part constituting the circuit and as such, the sensitivities of sending and receiving radio waves can be improved.

It is preferable for the projector that the optical element connected with the tripod-fixing part is a light source that launches light for image projection.

In the projector, it is made possible to cool the light source by connecting the light source, which launches light for image projection and generates the largest amount of heat among the optical elements constituting the optical system of the projector, with the tripod-fixing part. Therefore, the light source, which generates the largest amount of heat, is cooled and as such, the optical system can be cooled efficiently and effectively.

BRIEF DESCRIPTION OF THE DRAWINGS

The invention will be described with reference to the accompanying drawings, wherein like numbers reference like elements.

DESCRIPTION OF THE PREFERRED EMBODIMENT

The embodiment of the invention will be described below with reference to the drawings.

First Embodiment

Figure 1A:
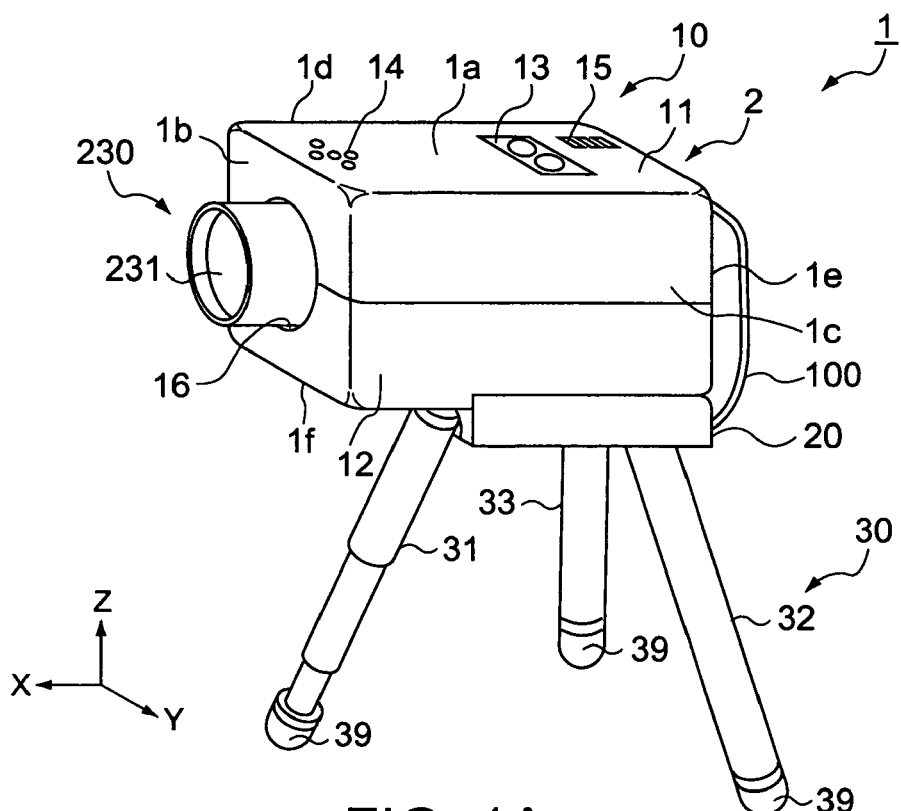
FIG. 1A is a general perspective view of a projector according to an embodiment of the invention with its tripod legs stretched wide apart, showing an external appearance of the projector.
Figure 1B:
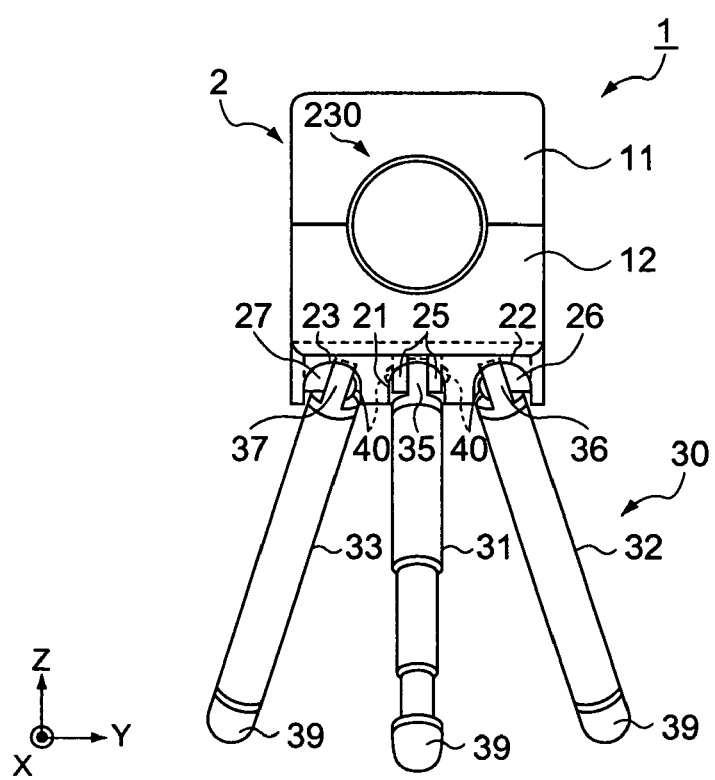
FIG. 1B is a front view of the projector with the tripod legs stretched wide apart.

FIG. 1A is a general perspective view of a projector according to an embodiment of the invention with its tripod legs stretched wide apart, showing an external appearance of the projector. FIG. 1B is a front view of the projector with the tripod legs stretched wide apart. With reference to FIGS. 1A, 1B, the configuration of the projector 1 will be described based on the external appearance.

For convenience of description of the configuration, the six exposed faces of the main body 2 of the projector 1 are identified as a top face 1a, a front face 1b, a left-side face 1c, a right-side face 1d, a backside face 1e and a bottom-side face 1f, respectively.

As shown in FIGS. 1A, 1B, the projector 1 includes: a generally rectangular parallelepiped housing 10 making an outer package of the main body 2 of the projector 1; a tripod-fixing part 20 connected and fixed to the bottom-side face 1f of the projector main body 2; and a tripod 30 fixed to the tripod-fixing part 20. As for the projector 1, the projector main body 2 can be adjusted and held so as to be at a given height using the tripod 30.

The housing 10 has an upper case 11 and a lower case 12. Also, the housing 10 is formed using a plastic material as a principal raw material. On the top face 1a of the upper case 11, there are formed a manipulating part 13 including as an electric power switch, and a sound-release hole 14 that serves to release the sound output from the speaker 400 (shown in FIG. 4) provided inside the projector main body 2. In addition, there is placed an LED (Light Emitting Diode) display part 15 that serves to indicate e.g. an operating state of the LED light source 212 (shown in FIGS. 3, 4) included by a light source 211 constituting an optical element to be described later. In a center portion of the front face 1b is formed a hole portion 16, through which a projection lens unit 230 accommodating a projector lens 231 to be described later protrudes.

In the back-side face 1e, there are provided connector-related components such as a connector (not shown) constituting an electric power connector 470 (shown in FIG. 4) for connection with an electric power adapter (not shown) and a coaxial cable connector 64 (shown in FIG. 3) that serves to connect the coaxial cable 100 connected with the tripod 30 to the circuit board 61 (shown in FIG. 3) inside the projector main body 2. In addition, a remote control radiation-receiving part (not shown) used to receive a signal from a remote controller 440 (shown in FIG. 4), etc. are placed there. The left-side face 1c and right-side face 1d form sidewalls of the housing 10 respectively.

The tripod-fixing part 20 is connected and fixed to the bottom-side face 1f. The tripod-fixing part 20 is also connected to a light source unit 210 (shown in FIG. 3) constituting an optical system 200 (shown in FIGS. 3, 4) inside the projector main body 2. The optical system is to be described later.

The tripod 30 is fixed to the tripod-fixing part 20, and has three legs 31, 32, 33, which can be stretched and folded freely and can be extended and contracted freely. The legs 31, 32, 33 are formed from columnar pipes. The leg 31 is constituted by a triple pipe, and has a rubber foot 39 arranged on the leading end of the pipe. The legs 32, 33 are each constituted by a double pipe, and have a rubber foot 39 arranged on the leading end of the pipe like the leg 31. The pipes constituting legs 31, 32, 33 are formed from an aluminum alloy. The pipes are threaded and therefore the pipes can be secured at an arbitrary length by extending the pipes while rotating them.

The legs 31, 32, 33 have leg-fixing parts 35, 36, 37 formed therein to connect with the tripod-fixing part 20, respectively. In the tripod-fixing part 20, leg-receiving parts 25, 26, 27 are formed corresponding to the leg-fixing parts 35, 36, 37. The leg-fixing parts 35, 36, 37 are fixed by the rivets 40 to the leg-receiving part 25, 26, 27. Thus, it becomes possible to freely stretch and fold the legs 31, 32, 33 about the axes of the leg-receiving parts 25, 26, 27. In this case, the legs 31, 32, 33 are secured to the leg-receiving parts 25, 26, 27 with a strength such that the legs can not be stretched and folded owing to the weight of the projector main body 2 and an external force to some extent.

The outside shape of the projector main body 2 measures approximately 100 mm×50 mm×50 mm (in X direction×Y direction×Z direction) without the projection lens unit 230. The height of the tripod 30 with its legs stretched wide apart is approximately 150 mm when the legs 31, 32, 33 are extended to their maximum lengths.

Figure 2A:
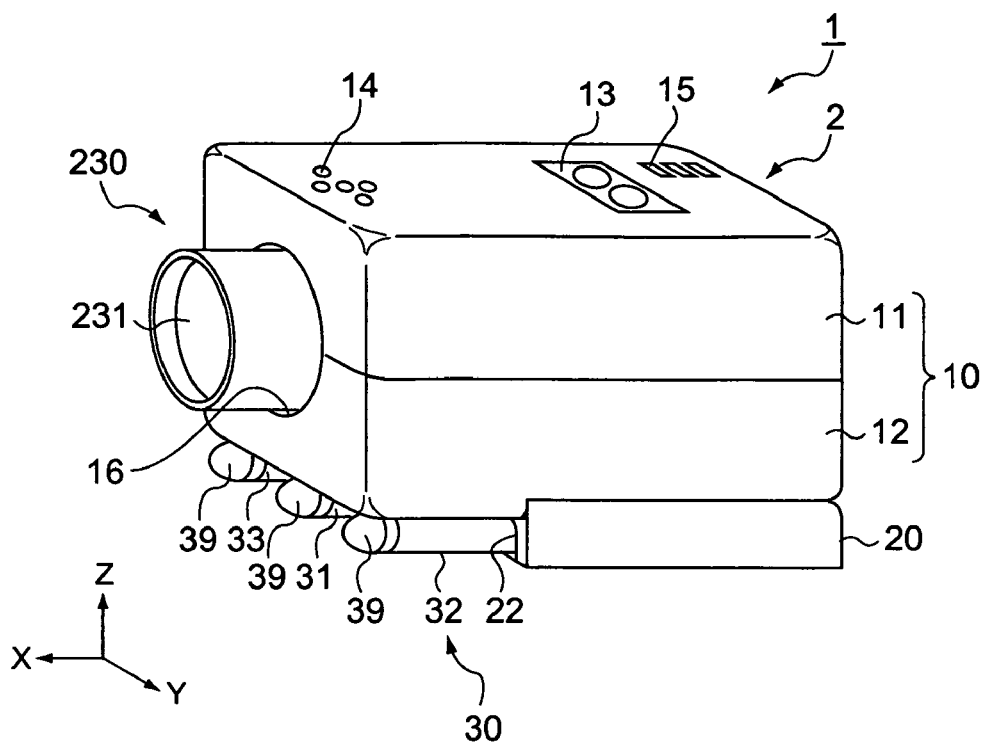
FIG. 2A is a general perspective view of the projector with its tripod legs folded and accommodated in a tripod-fixing part, showing another external appearance of the projector.
Figure 2B:
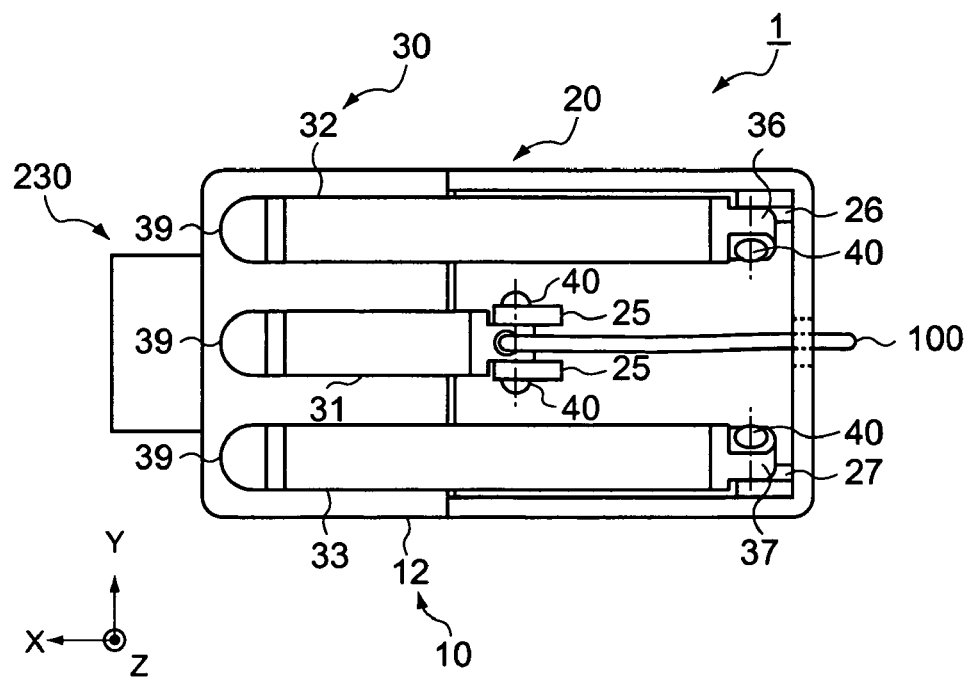
FIG. 2B is a bottom view of the projector with the tripod legs folded and accommodated in the tripod-fixing part.

FIG. 2A is a general perspective view of the projector with its tripod legs folded and accommodated in a tripod-fixing part, showing another external appearance of the projector. FIG. 2B is a bottom view of the projector with the tripod legs folded and accommodated in the tripod-fixing part. With reference to FIGS. 2A, 2B, the configuration of the projector 1 will be described based on the external appearance thereof.

As shown in FIGS. 2A, 2B, the tripod 30 can be accommodated in the tripod-fixing part 20 by contracting the legs 31, 32, 33 of the tripod 30 to their shortest lengths and folding the legs along the leg-receiving parts 25, 26, 27. In this case, the legs 31, 32, 33 are guided respectively by the leg-guiding concave parts 21, 22, 23 formed in the tripod-fixing part 20 shown in FIG. 1B, and then accommodated and as such, the legs 31, 32, 33 can be secured without rattling. In addition, the legs 31, 32, 33 are designed so as to have a length that allows the legs to go in the outside shape of the projector main body 2 in this condition. Further, when the projector 1 is put on a desk in this condition, the projector 1 can be placed in parallel with a top face of the desk without rattling and as such, the projector 1 can be operated in a stable position to project an image. Also, in this condition, the projector 1 can be brought with a user, transported and conveyed.

Figure 3:
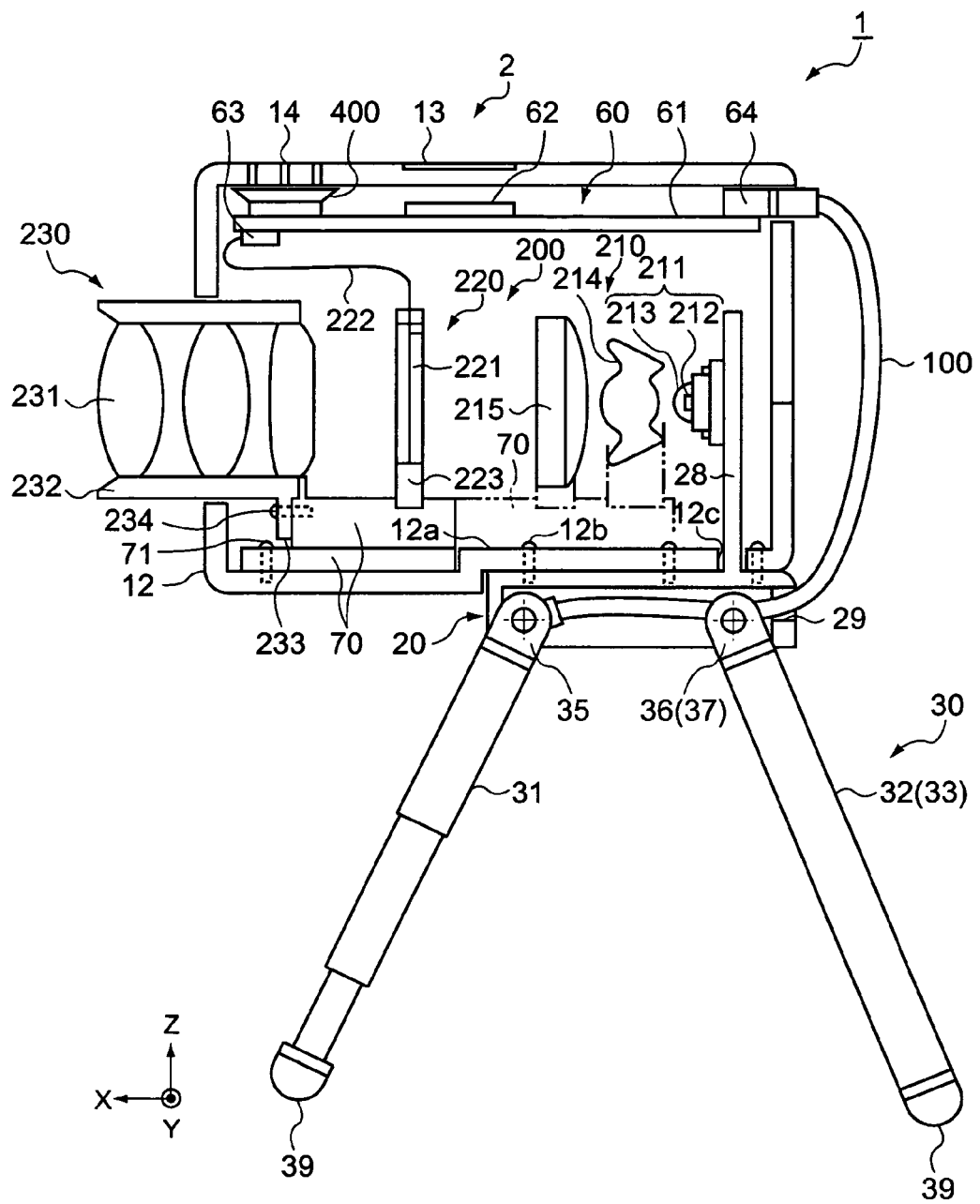
FIG. 3 is a general sectional view of the projector.

FIG. 3 is a general sectional view of the projector. The configuration and operations of the projector 1 will be described with reference to FIG. 3.

As shown in FIG. 3, the inside of the projector main body 2 basically includes an optical system 200 and a circuit unit 60.

The configuration when the optical system 200 is viewed from the standpoint of optics will be described.

The optical system 200 has a light source 211, a collimator lens 214, an extension lens 215, a liquid crystal light valve 221 and a projection lens 231. Further, the light source 211 has an LED light source 212 as a light-emitting source, and a condenser lens 213.

Figure 4:
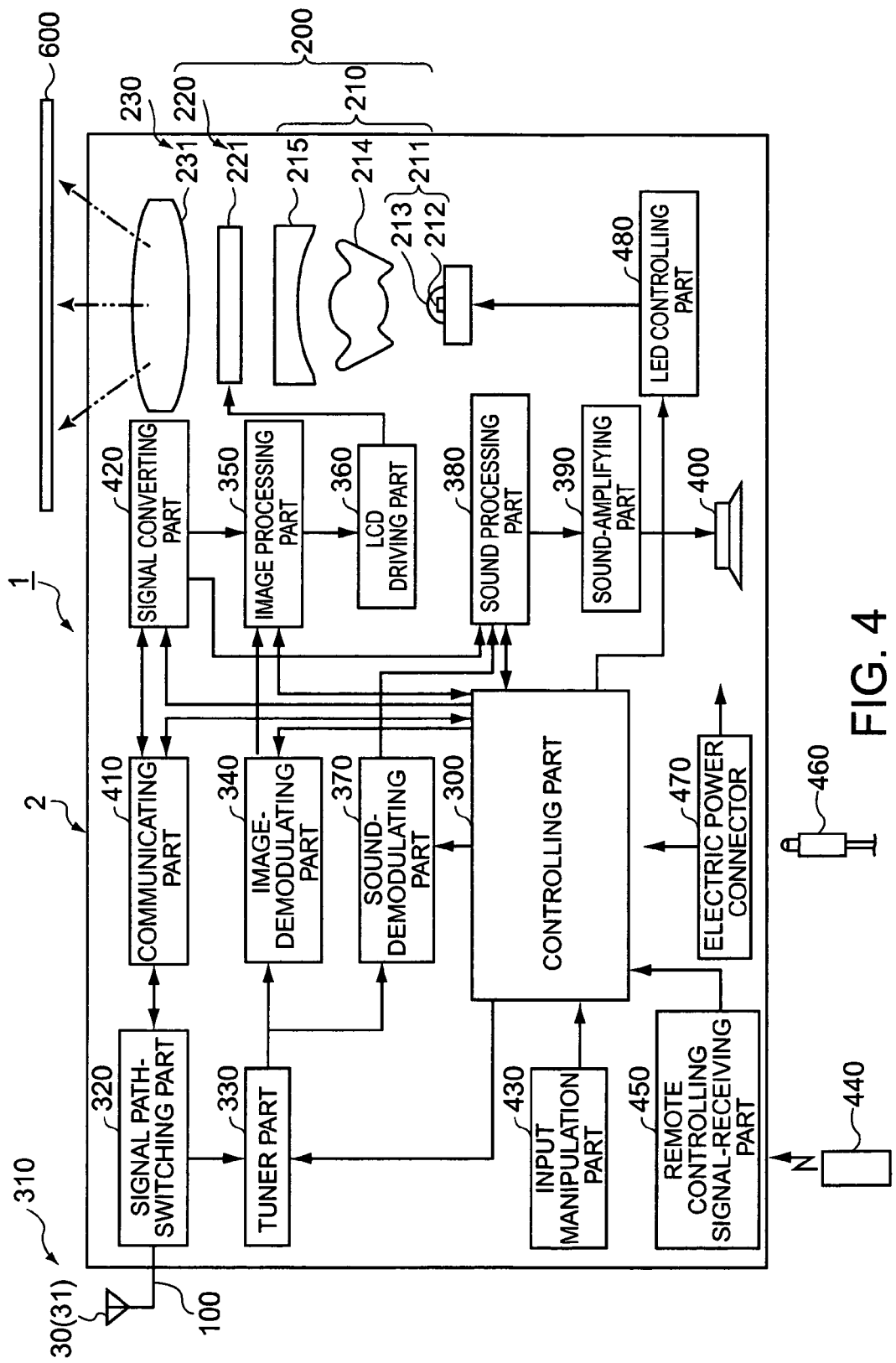
FIG. 4 is a circuit block diagram of the projector.

The LED light source 212 emits light under the control of the LED controlling part 480 (shown in FIG. 4). The LED light source 212 is capable of emitting white light (including any color lights).

The condenser lens 213 serves to launch the light emitted by the LED light source 212 frontward efficiently. The collimator lens 214 converts the light emitted by the light source 211 into parallel light and releases the light. The extension lens 215 extends the parallel light released by the collimator lens 214 so as to fit in size to a given incident light region (not shown) of the liquid crystal light valve 221, and launches the light.

In the embodiment, a transmission type color liquid crystal panel is used as the liquid crystal light valve 221. The liquid crystal light valve is driven according to a signal from the LCD driving part 360 (shown in FIG. 4) and modulates the light released by the extension lens 215 thereby to convert the light into an image. However, the liquid crystal light valve 221 is not limited to a transmission type liquid crystal panel, it may be e.g. a reflection-type liquid crystal panel or a digital micromirror device.

The projection lens 231 is made up of some kinds of lenses, and enlarges an image modulated and produced by the liquid crystal light valve 221 and launches the resultant image to the outside of the projector 1.

In this way, the projector 1 enlarges an image and projects the image onto a projection plane of a screen 600 (shown in FIG. 4) or the like, which is placed outside the projector 1.

Now, the configuration of the optical system 200 will be described from the viewpoint of its mechanism.

The optical system 200 includes a light source unit 210, a light valve unit 220 and a projection lens unit 230.

The light source unit 210 includes a light source 211 (including the LED light source 212 and condenser lens 213), a collimator lens 214, and an extension lens 215.

The light valve unit 220 includes a liquid crystal light valve 221, a light valve frame 223 that accommodates and fixes the liquid crystal light valve 221 and a flexible light valve cable 222 connected with the liquid crystal light valve 221. The light valve cable 222 is connected with a light valve cable connector 63 mounted on the circuit board 61 to be described later, and transmits a drive signal from the LCD driving part 360 (shown in FIG. 4) to the liquid crystal light valve 221. The liquid crystal light valve 221 displays in color according to a drive signal transmitted through the light valve cable 222.

The projection lens unit 230 includes a projection lens 231 made up of some kinds of lenses and a cylindrical projection lens frame 232 that accommodates the projection lens 231 in position. The projection lens frame 232 has a projection lens attachment part 233 to fix the projection lens unit 230 to a fixing frame 70 to be described later. Moreover, it is possible to adjust the projection lens unit 230 in focal point and zoom. Therefore, a user can adjust the projection lens unit 230 by rotating the respective rotatable parts for adjustment (not shown) configured on the projection lens frame 232.

The light valve unit 220 and projection lens unit 230 are fixed to the fixing frame 70. Specifically, the projection lens attachment part 233 is set in position on the fixing frame 70 and then the projection lens unit 230 is fixed to the fixing frame 70 with a mounting screw 234. The light valve unit 220 is fixed by setting a given location of the light valve frame 223 so as to fit to a given location on the fixing frame. The fixing frame 70, to which the light valve unit 220 and the projection lens unit 230 are fixed, is fixed in position on the lower case 12 with mounting screws 71.

Now, the structure and configuration of the circuit unit 60 will be described schematically.

The circuit unit 60, which is a part that constitutes a circuit, includes the circuit board 61 with elements mounted thereon; the elements constitute the circuit portions for the circuit blocks (shown in FIG. 4) included in the circuit of the projector 1, which are to be described later. The circuit unit 60 is accommodated in position inside the upper case 11 and fixed to the upper case 11.

The circuit unit 60 includes the circuit board 61 as its base. On the circuit board, there are mounted a CPU(Central Processing Unit) 62, the light valve cable connector 63 to which the light valve cable 222 is connected, a coaxial cable connector 64 to which the coaxial cable 100 is connected, a connector (not shown) which constitutes an electric power connector 470 (shown in FIG. 4) and which a power source jack 460 (shown in FIG. 4) running from the external electric power adapter is connected to, a speaker 400, etc. In the drawing, the other circuit elements are omitted.

Now, the structures and functions of the tripod-fixing part 20 and tripod 30 will be described in detail.

The tripod-fixing part 20 has a boxy shape. The lower case 12 is stepped, and has a step portion 12a, which forms an opening having a boxy shape on an outer side of the lower case. In the position where the opening faces downward, the tripod-fixing part 20 is fixed to a given location of the lower case 12 on an outer side of the step portion 12a by fixing screws 12b, in which the fixing screws penetrate the lower case from an inner side of the step portion 12a. Also, the tripod-fixing part 20 has a substantially rectangular plate-shaped part 28 formed protruding therefrom. The plate-shaped part is inserted in the projector main body 2 through an inlet 12c formed in the step portion 12a. The plate-shaped part 28 formed on the tripod-fixing part 20 is connected with the light source 211 that the light source unit 210 includes. Further, the tripod-fixing part 20 is connected with the tripod 30 as described with reference to FIGS. 1A, 1B, 2A, 2B.

The light valve unit 220, projection lens unit 230, collimator lens 214 and extension lens 215 are fixed to the lower case 12 through the fixing frame 70. However, the light source 211 of the light source unit 210 is connected to the plate-shaped part 28 on the tripod-fixing part 20 thereby to be fixed to the lower case 12. Alternatively, for example, the light source unit 210 may be stored in a case or the like into an integrated form, thereby imparting, to the tripod-fixing part 20, the function of supporting the optical system 200 in position inside the projector main body 2 as a supporting member has.

The tripod-fixing part 20 has a heat conductive property, and is formed from electrically insulative alumina ceramics ($Al_2O_3$). Therefore, the heat generated by the light source 211 is transmitted to the plate-shaped part 28 connected to the light source 211 and then transmitted to the tripod-fixing part 20. The heat that has reached the tripod-fixing part 20 is transmitted to the tripod 30 formed from an aluminum alloy having a high thermal conductivity. Then, the heat transmitted to the tripod 30 is released into the outside air. This heat transmission cycle allows the light source 211 to be cooled efficiently. The material for the tripod-fixing part 20 is not limited to alumina ceramics. The tripod-fixing part 20 may be formed from silicon nitride (SiN) or the like. In this embodiment, the legs 31, 32, 33 of the tripod 30 are used as a heat-dissipating member.

The leg 31 of the tripod 30 has the above-described leg-fixing part 35, to which the coaxial cable 100 for high frequencies, an electrically conductive connecting member, is connected and fixed. The coaxial cable 100 extends through a cable hole 29 formed in the tripod-fixing part 20 and is connected to the coaxial cable connector 64 mounted on the circuit board 61. According to such configuration, the leg 31 of the tripod 30 is used as an antenna 310 (shown in FIG. 4) in this embodiment.

By using the leg 31 of the tripod 30 as the antenna 310, the projector 1 attains the functions of receiving image data and sound data sent from a personal computer (not shown) through the leg 31 used as the antenna 310, projecting the resultant image onto the screen 600 or the like and outputting sound through the speaker 400. In addition, the projector 1 also has the function of sending the data for the setting of the projector 1 and the data when any trouble has taken place to the personal computer through the leg 31 used as the antenna 310. Otherwise, the projector 1 has the functions of receiving television broadcasting airwaves (hereinafter referred to as TV waves) through the leg 31 used as the antenna 310, projecting an image that a television broadcast contains (i.e. television picture) onto the screen 600 or the like and outputting sound that the television broadcast contains (i.e. television sound) through the speaker 400.

When the leg 31 of the tripod 30 is used as the antenna 310, the tripod-fixing part 20 having an electrically insulating property is interposed between the circuit unit 60 and the leg 31, whereby noise is prevented from entering the circuit unit 60 structurally. Further, the structure in which the circuit unit 60 and the tripod-fixing part 20 are provided in positions opposed to each other with the light source 211 located in the middle of the spacing therebetween makes it possible to ensure a distance between the circuit unit 60 and the leg 31 used as the antenna 310, thereby further preventing noise from entering the circuit unit 60.

FIG. 4 is a circuit block diagram of the projector. The configuration and operations of the circuit of the projector 1 will be described with the reference to FIG. 4.

Now, the circuit configuration of the projector 1 is described.

As shown in FIG. 4, the projector 1 has: an antenna 310; a signal path-switching part 320; a tuner part 330; an image-demodulating part 340; an image processing part 350; an LCD (Liquid Crystal Display) driving part 360; a sound-demodulating part 370; a sound processing part 380; a sound-amplifying part 390; a speaker 400; a communicating part 410; a signal converting part 420; an input manipulation part 430; a remote controlling signal-receiving part 450 that receives a signal from a remote controller 440; an electric power connector 470 connected with the power source jack 460 included by the external electric power adapter (not shown); an LED controlling part 480; and a controlling part 300 that performs centralized control of the optical system 200 and the entire projector 1.

In the projector 1, the antenna 310 is made up of the leg 31 of the tripod 30, and the coaxial cable 100 connects between the leg 31 of the tripod 30 used as the antenna 310 and the signal path-switching part 320.

Now, the operations of the parts will be described.

First, the operations of the parts when the projector 1 receives image data (still image data and moving image data) and sound data sent by a personal computer will be described.

When the controlling part 300 switches the signal path-switching part 320 according to a manipulation signal from the manipulating part 13 included by the input manipulation part 430 or the remote controller 440 so as to bring the projector into the condition where it can receive a signal sent by the personal computer, the communicating part 410 receives coded image data and sound data, etc. from the personal computer through the antenna 310, coaxial cable 100 and signal path-switching part 320. The received image data and sound data are decoded by the signal converting part 420. Then, the resultant image data is output to the image processing part 350 and the resultant sound data is output to the sound processing part 380.

The image processing part 350 carries out the processes including frame rate conversion and scaling on the image data input from the signal converting part 420. In addition, the image processing part 350 performs various kinds of image corrections such as brightness adjustment, contrast adjustment, and gamma correction on the image data. The image data that has been thus processed is output to the LCD driving part 360 as image signals for projection. The LCD driving part 360 drives the liquid crystal light valve 221 based on the image signals for projection input from the image processing part 350.

The sound processing part 380 converts sound data in digital signals input from the signal converting part 420 into analog signals. The resultant signals are amplified by the sound-amplifying part 390, and reproduced and output as sound by the speaker 400.

As an example, the projector 1 communicates with the personal computer according to IEEE80 2.11a (Institute of Electronic and Electronics Engineers 802.11a) standard, a short-range radio communication standard. The means for communication is not limited as described above. Such communication may be performed according to a radio communication standard such as IEEE802.11b, IEEE802.11g, Bluetooth or UWB(Ultra Wide Band).

Now, the operations of the parts in the case of sending the data for the setting of the projector 1 and the data when any trouble has taken place to the personal computer through the antenna 310 will be described.

In this case, the controlling part 300 switches the signal path-switching part 320 according to a manipulation signal from the input manipulation part 430 or the remote controller 440 and a manipulation signal from the personal computer so as to bring the projector into the condition where it can send data to the personal computer. Then, various kinds of setting data for the projector 1 stored in a storage part (not shown) of the controlling part 300 and the data on the trouble that has taken place in the projector 1, etc. are coded by the signal converting part 420, and sent by the communicating part 410 through the signal path-switching part 320, coaxial cable 100 and antenna 310 to the personal computer.

Next, the operations of the parts when TV waves are received will be described.

The controlling part 300 switches the signal path-switching part 320 according to a manipulation signal from the input manipulation part 430 or the remote controller 440 so as to bring the projector into the condition where it can receive TV waves. Then, TV waves received through the antenna 310 and coaxial cable 100 are input as received signals to the tuner part 330 through the signal path-switching part 320. The tuner part 330 picks up broadcast signals of a broadcast channel selected by the input manipulation part 430 or the remote controller 440 out of the input received signals and distributes the broadcast signals to the image-demodulating part 340 and the sound-demodulating part 370.

The image-demodulating part 340 demodulates image signals from the broadcast signal input from the tuner part 330, and outputs the resultant signals to the image processing part 350. The image processing part 350 converts analog image signals input from the image-demodulating part 340 into digital image data. Then, the image processing part 350 carries out the processes including frame rate conversion and scaling on the image data of the input television picture as in the case of image data input from the personal computer. In addition to such processes, the image processing part 350 performs various kinds of image corrections such as brightness adjustment, contrast adjustment, and gamma correction on the image data. The image data that has been thus processed is output to the LCD driving part 360 as image signals for projection.

The LCD driving part 360 drives the liquid crystal light valve 221 included by the optical system 200 according to the image signals for projection input from the image processing part 350.

On the other hand, the sound-demodulating part 370 demodulates sound signals form the broadcast signals input from the tuner part 330 and outputs the resultant signals to the sound processing part 380. The sound signals input from the sound-demodulating part 370 are subjected to the processes in the sound processing part 380 and the sound-amplifying part 390, and output to the speaker 400, and thus television sound is reproduced and outputs from the speaker.

The remote controlling signal-receiving part 450 receives a signal sent from the remote controller 440 through the remote control radiation-receiving part (not shown) and outputs the received signal to the controlling part 300. Incidentally, the remote controller 440 communicates by means of infrared light.

The electric power to drive the projector main body 2 is supplied through an electric power adapter (not shown) that is prepared separately from the projector 1. Accordingly, the projector includes the electric power connector 470, which is connected to the power source jack 460 of the electric power adapter.

The LED controlling part 480 performs brightness control of the LED light source 212, which is to be described later, according to a signal from the controlling part 300. Specifically, the LED controlling part 480 changes the drive frequency and duty ratio to drive the LED light source 212 corresponding to an image scene. Thus, in the case of a bright scene, the LED controlling part 480 makes the LED light source 212 emit light brightly by increasing the drive frequency or elongating "ON" time of the duty ratio. In contrast, in the case of a dark scene, the LED controlling part 480 performs control to suppress the light emission by the LED light source 212 thereby to make the light source dark by reducing the drive frequency or shortening "ON" time of the duty ratio.

The above-described embodiment can provide the following advantages.

(1) According to the embodiment, the projector 1 has a tripod 30, a tripod-fixing part 20 to fix the tripod 30 and a projector main body 2, which are integrated into a single form. The tripod-fixing part 20 is connected to the light source 211 included by the optical element. The tripod-fixing part 20 is formed from alumina ceramics which is a member having a heat conductive property. Also, the tripod 30 is formed from an aluminum alloy, which is a member having a heat conductive property. Thus, the following are made possible: to efficiently transmit the heat generated by the light source 211 to the tripod-fixing part 20; to conduct the heat that has reached the tripod-fixing part 20 to the tripod 30; and to efficiently release the heat from the tripod 30 into the outside air. Therefore, the efficiencies of heat conduction and heat dissipation can be enhanced and as such, the cooling efficiency of the light source 211 can be increased.

(2) According to the embodiment, the projector 1 has: a circuit unit 60 that is a part constituting a circuit to send and receive radio waves; a tripod-fixing part 20 formed from a heat-conductive and electrically insulative member of alumina ceramics or the like; and a leg 31 of the tripod 30 formed from an electrically conductive member of an aluminum alloy or the like. In addition, the coaxial cable 100 for high frequencies, an electrically conductive connecting member is used to connect between the leg 31 and the coaxial cable connector 64 included by the circuit unit 60. Thus, in addition to using the tripod 30 as a member for heat dissipation, it becomes possible to use the leg 31 of the tripod 30 as the antenna 310. Further, the tripod-fixing part 20, to which the tripod 30 is fixed, is constituted by an electrically insulative member and as such, it is possible to prevent noise from entering the circuit unit 60. Therefore, the sensitivities of sending and receiving radio waves can be improved. Also, the sensitivities of receiving radio waves can be adjusted by extending and contracting the leg 31.

(3) According to the embodiment, the circuit unit 60, which is a part constituting a circuit, and the tripod-fixing part 20 constituted by a heat-conductive and electrically insulative member are provided in positions opposed to each other with the light source 211 making an optical element located in the middle of the spacing therebetween and as such, the circuit unit 60 can be located at a distance from the tripod-fixing part 20, to which the tripod 30 is fixed, inside the projector main body 2. Thus, the heat generated by the light source 211 can be kept at a distance from the circuit unit 60. Therefore, the conduction of the heat generated by the light source 211 to the circuit unit 60 can be reduced, and the operation performance of the circuit unit 60 can be maintained. In addition, the following are made possible: to keep the circuit unit 60 and the leg 31 used as the antenna 310 at a distance from each other thereby to ensure the distance therebetween; to prevent noise from entering the circuit unit 60; and to improve the sensitivities of sending and receiving radio waves.

(4) According to the embodiment, the optical element connected with the tripod-fixing part 20 is the light source 211, which launches light for image projection and generates the largest amount of heat among the optical elements constituting the optical system 200 of the projector 1. The therefore the light source 211 can be cooled. Cooling the light source 211 that generates the largest amount of heat allows the optical system 200 to be cooled efficiently and effectively.

(5) According to the embodiment, use of the tripod 30 that is integrated with the projector main body 2 in the compact projector 1 allows the projector main body 2 to be borne up to a higher location and fixed there and accordingly enables the projection in this position. Thus, it becomes possible to solve a trouble such that a lower part of a projected image is projected onto a plane of a desk, which is caused owing to a tilt angle at which the projector projects an image, for example, in the case where the projector in use is placed on the desk.

The invention is not limited to the above-described embodiment, and various modifications, changes and improvements can be made. Some of such modifications will be described below.

First Modification

While the tripod-fixing part 20 is constituted by a member having both a heat-conductive property and an electrically insulating property in the above embodiment, the invention is not so limited. Considering only the efficiency of heat conduction, the tripod-fixing part 20 may be constituted by a heat-conductive member of a metal having a high thermal conductivity such as an aluminum alloy, a copper alloy or a magnesium alloy, whereby the efficiency of heat conduction can be further increased and the heat generated by the light source 211 can be cooled more efficiently.

Second Modification

While in the above embodiment, the legs 31, 32, 33 that constitute the tripod 30 are formed from an electrically conductive aluminum alloy having a high thermal conductivity, the invention is not so limited. The legs 31, 32, 33 may be formed from, for example, a copper alloy or a magnesium alloy as long as they are constituted by electrically conductive members having a high thermal conductivity.

Third Modification

In the above embodiment, what is connected as an optical element connected to the plate-shaped part 28 on the tripod-fixing part 20 is the light source 211. However, for example, in the case where the amount of heat generation in the liquid crystal light valve 221 is the largest among the optical elements that constitute the optical system 200, the light valve unit 220 may be used in connection with the tripod-fixing part 20.

Fourth Modification

While in the above embodiment, one of the three legs 31, 32, 33 constituting the tripod 30, i.e. the leg 31 is connected with the coaxial cable 100 and thereby to use the leg 31 as the antenna 310, the invention is not so limited. The legs 32, 33 may be connected to the leg 31 through an electrically conductive member and used as the antenna 310. Thus, the sensitivities of receiving radio waves can be further increased.

Fifth Modification

While in the above embodiment, the tripod 30 used as the antenna 310 is based on the specifications to receive analog TV waves, the invention is not so limited. The tripod 30 may be applied to receive digital terrestrial TV waves.

Sixth Modification

The structure of fixing the tripod-fixing part 20 and the tripod 30 in the above embodiment is not limited as in the above embodiment, and it may be appropriately changed within a scope in which the subject matter of the invention is unchanged.

Seventh Modification

The projector 1 in the above embodiment is a projector according to the transmission type liquid crystal system. However, the invention is not so limited, the projector 1 may be a projector for which e.g. DLP (registered trademark) system (DLP: Digital Light Processing) or LOCOS (Liquid Crystal On Silicon) system, which is a reflection type liquid crystal system, is adopted.

The entire disclosure of Japanese Patent Application No. 2005-022682, filed Jan. 31, 2005 is expressly incorporated by reference herein.

What is claimed is:

1. A projector for image projection, comprising:
   a lens;
   a light source included by an optical system to project an image through the lens;
   a tripod that supports the projector; and
   a tripod-fixing part that is connected with the light source and fixes the tripod,
   wherein the tripod and the tripod-fixing part are each constituted by a heat-conductive member, and arranged so that the tripod and the tripod-fixing part are nonremovable from a projector main body.

2. The projector of claim 1, further comprising a part that constitutes a circuit to send and receive radio waves,
   wherein the part constituting the circuit and the tripod-fixing part are provided in positions opposed to each other with the light source located in a middle of a spacing therebetween.

3. The projector of claim 1, further comprising a part that constitutes a circuit to send and receive radio waves,
   wherein the tripod is constituted by a heat-conductive and electrically conductive member,
   the tripod-fixing part is constituted by a heat-conductive and electrically insulative member,
   at least one leg of the tripod is connected to the part that constitutes the circuit through an electrically conductive connecting member.

4. The projector of claim 3, wherein the part constituting the circuit and the tripod-fixing part are provided in positions opposed to each other with the light source located in a middle of a spacing therebetween.

5. The projector of claim 1, wherein the light source connected with the tripod-fixing part is a light source that launches light for image projection.

* * * * *